United States Patent [19]

Kaye

[11] Patent Number: 5,143,330
[45] Date of Patent: Sep. 1, 1992

[54] CONTROL APPARATUS

[75] Inventor: Arthur Kaye, Warton, Great Britain

[73] Assignee: British Aerospace Public Limited Company, London, England

[21] Appl. No.: 672,312

[22] Filed: Mar. 20, 1991

[30] Foreign Application Priority Data

Apr. 17, 1990 [GB] United Kingdom ............... 9008526

[51] Int. Cl.$^5$ .......................................... B64C 13/04
[52] U.S. Cl. ................................. 244/234; 244/236
[58] Field of Search ............... 244/75 R, 234, 235, 244/236, 237, 12.5, 230, 52; 60/22 E, 232, 235; 74/471 XY, 471 R, 523, 491; 200/6 A, 61.85

[56] References Cited

U.S. PATENT DOCUMENTS

| 2,481,776 | 9/1949 | Osborn | 244/236 |
|---|---|---|---|
| 3,061,241 | 10/1962 | Holland, Jr. | 244/236 |
| 3,098,628 | 7/1963 | Chaplin | 244/234 |
| 3,166,273 | 1/1965 | Balluff | 244/52 |
| 3,409,252 | 11/1968 | Miller | 244/237 |
| 4,574,651 | 3/1986 | Nordstrom | 244/234 |
| 4,667,909 | 5/1987 | Curci | 244/234 |
| 4,901,948 | 2/1990 | Panos | 244/23 D |
| 4,901,952 | 2/1990 | Curtis | |
| 4,982,918 | 1/1991 | Kaye | |

FOREIGN PATENT DOCUMENTS 0265035 8/1989 European Pat. Off. .
0326439 8/1989 European Pat. Off. .

Primary Examiner—Galen Barefoot
Attorney, Agent, or Firm—Cushman, Darby & Cushman

[57] ABSTRACT

Control apparatus comprises a throttle stick suitable for STOVL aircraft which incorporates vectorable nozzle control means with thrust demand, thus obviating the need for a separate control lever for controlling vectorable nozzles. A handle (10) rotates to pre-determined angular positions in response to operator-exerted pressure, said pressure being sensed by force transducers (7a, 7b) hence providing the operator with tactile feedback proportional to thrust demand. A control lever (2) attached to the handle (10) is pivotable about a hinge pin (8). Rotation of the lever (2) about the pin (8) is sensed by a potentiometer (9) whose output is used to control vectorable nozzles.

4 Claims, 2 Drawing Sheets

CONTROL APPARATUS

BACKGROUND OF THE INVENTION

The present invention concerns control apparatus particularly but not exclusively useful for a short take-off and vertical landing (STOVL) aircraft having one or more engine(s), usually gas turbine jet engine(s) and vectorable or swivellable nozzle(s) pivotable between a substantially horizontal position for wing-borne flight and a substantially vertical position for jet-borne flight, e.g. vertical take-off, hovering and vertical landing.

Control apparatus for aircraft usually includes a control lever forming part of a thrust demand unit or throttle box by means of which a pilot or an auto-pilot mechanism may control the forward/idle/reverse thrust operation of aircraft.

The invention is concerned with control levers of the type which are responsive, without movement, to progressive force application by the operator. The control levers may then be force throttles. The term "force throttle" means an engine control device including a throttle lever which is not mechanically linked to the associated apparatus, i.e. engine fuel control system, but is linked by a system of force sensors, sensing the attempted movement of the lever by the operator, and electrical, optical or other non-mechanical signal transmission lines to suitable transducers and actuators for mechanically operating the engine fuel control system. Such mechanical counterparts, and typically the lever may be small enough to be operated single-handedly by the pilot using only his thumb and forefinger to apply demand pressure.

In EP-A-0,326,439 the priority application of which forms the basis of U.S. Pat. No. 4,982,918, I have described and claimed a force throttle responsive to forces exerted thereon by an operator, a handle pivoted on the lever of the force throttle for rotation about an axis transverse to a direction of application of said forces, and means for rotating said handle to predetermined angular positions dependent on said forces and each indicative of a separate one of a plurality of thrust demands required of an associated gas turbine engine to which in use said force throttle is to be connected.

The force-throttle described in EP-A-326,439 is well able to control thrust, but is limited to that function and separate control apparatus is required for other control purposes. In particularly, for a STOVL aircraft the pilot would require a separate control member (lever) for controlling the orientation of vectorable nozzle means.

However, this is a disadvantage for modern aircraft where the aim must be not to overload the operator. This is particularly important in a military aircraft application where ever increasing demands are made of pilots of modern fighter aircraft. In addition to flying the aircraft the pilot is often required to manage complex weapons, electronic counter-measures, electronic surveillance, electronic navigation, computer and communications systems. Moreover, the control member should take up the minimum amount of available space.

SUMMARY OF THE INVENTION

According to the present invention, there is provided control apparatus for a STOVL aircraft having an engine and vectorable nozzle means, the apparatus comprising a force throttle with a lever responsive to forces exerted thereon by an operator, a handle which is pivoted on said lever or rotation about an axis transverse to a direction of application of said forces, means for rotating said handle in a first plane to predetermined angular positions dependent on said forces and effective in use to provide first control signals to remotely located means for controlling engine thrust, the magnitude of which is indicated by said predetermined angular positions, and means for pivoting a lever of said force throttle in a second plane generally orthogonal to said first plane and effective in use to provide second control signals to remotely located means for controlling the orientation of said vectoring means between a horizontal position for normal flight and a vertical position for take-off, landing or hovering flight.

Thus the invention provides a combined aircraft engine force and nozzle vectoring lever, which saves space and makes a pilot's task easier.

Advantageously, the apparatus disclosed in EP-A-0,326,439 is modified by providing an appropriate articulated mechanism, e.g. a hinge pin, on the stem of the control lever, which mechanism may be located within the console, the arrangement being such that the thrust indicating movement of the handle is an arcuate movement in a longitudinal plane (fore-and-aft) and the vectoring control movement of the lever is a transverse arcuate movement in which the pilot rotates his wrist outwardly towards the fuselage to rock the lever about the articulation or hinge.

Means may be provided to prevent vectoring nozzle movement when the throttle setting is below a predetermined value e.g. 85%.

The handle of the force throttle may include a toothed belt entrained around and meshing with a freely rotating roller and a sleeve, the latter accommodating within it a drive motor and an epicyclic gearbox, whereby a push or pull on the handle will cause the motor to rotate, drive the gearbox and rotate the handle.

BRIEF DESCRIPTION OF THE DRAWINGS

The invention will now be described, by way of example, with reference to the drawings of which.

DESCRIPTION OF THE PREFERRED EMBODIMENTS

Figure 1:
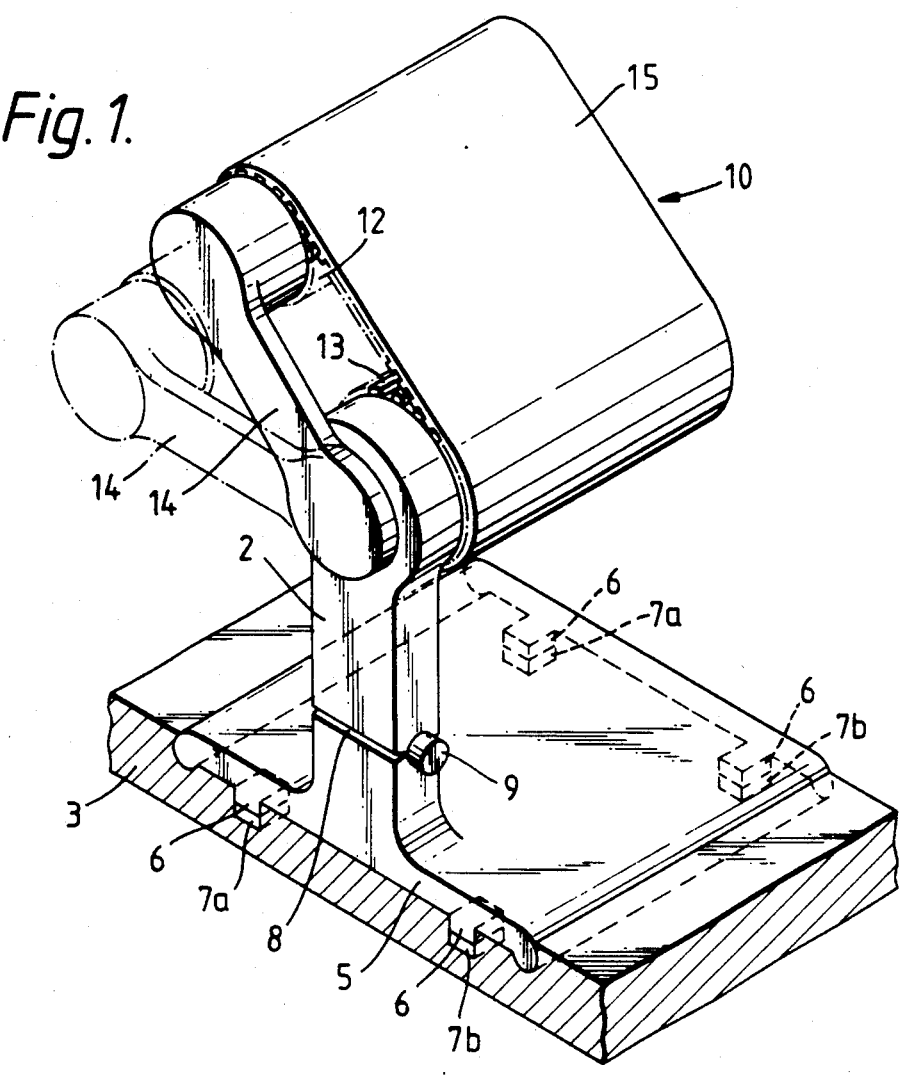
FIG. 1 is a schematic, perspective view of the combined throttle and vectoring apparatus in accordance with the invention, showing two different operating positions.
Figure 4:
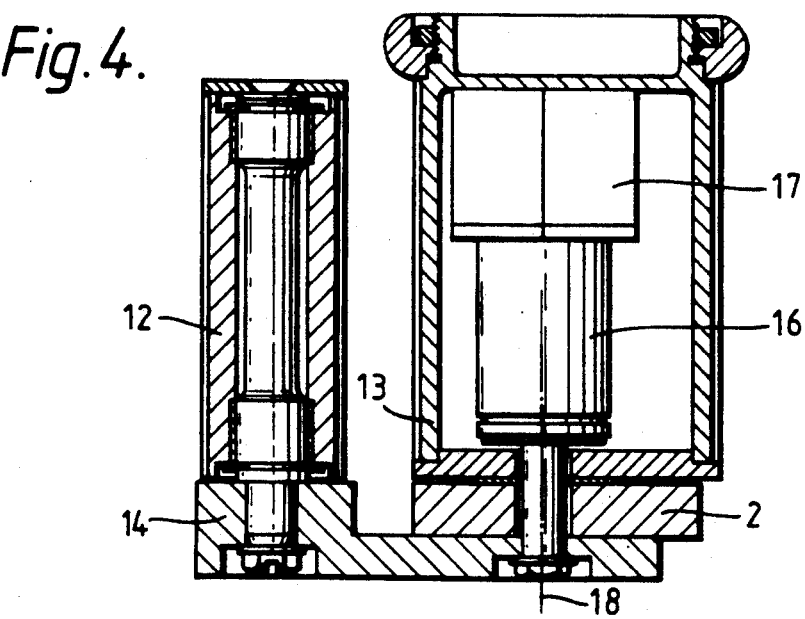
FIG. 4 is a sectional view along the line Y—Y$^1$ of FIG. 2.
Figure 2:
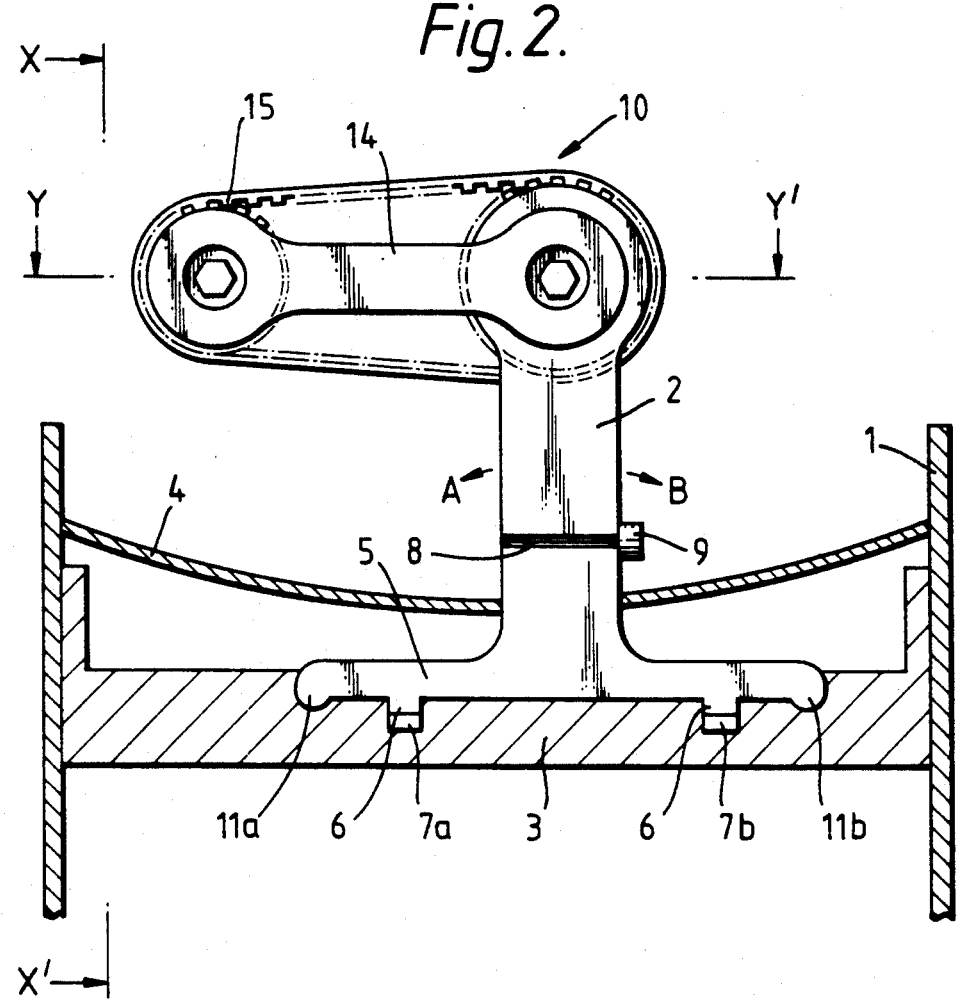
FIG. 2 is a side view of the invention.
Figure 3:
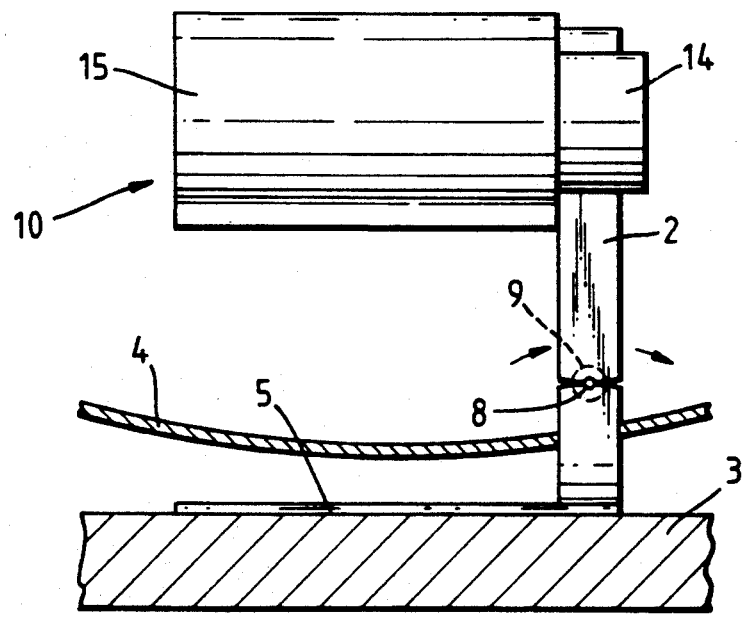
FIG. 3 is a sectional view along the line X—X$^1$ of FIG. 2.

A pilot's force throttle as shown particularly in FIGS. 1, 2 and 3, has been designed for fitting in an aircraft cockpit structure particularly the cockpit of a military aircraft such as a fighter aircraft. Conventionally such a force throttle will be located in a console adjacent the pilot's left hand in a single engined military aircraft or in a central console in the case of fitting to a multi-engined civil aircraft. An upper external surface of the console is shown at 1. The force throttle comprises a control level 2 secured at its lower end to a support structure 3. The lever may be moved to a limited extent in a force and aft direction, fore being to the left of FIG. 1 and aft being to the right of FIG. 1. The range of fore and aft movements is limited and indicated by the arrows A and B respectively.

From the walls of the console 1 is hung a general bow-shaped resilient member 4. The resilient member seals and prevents ingress of dust to a chamber below and is provided with a slot through which the lever 2 passes. The slot is dimensioned to be substantially equal in shape and area to the cross-section of the lever 2.

The lever 2 is integral with a base support 5 (generally rectangular in plan) which incorporates four pressure pads 6. Each pad bears on one of four force transducers, 7a, 7b, mounted on the support structure 3, holding them in compression.

The lever 2 is hinged at 8. Any articulated or hinged connection 8 may be used which enables the lever 2 to pivot orthogonally to the fore-and-aft movements in the direction shown by the arrow in FIG. 3. This movement is used to control the swivelling movement of vectoring nozzles (not shown). The movement is sensed by a rotary potentionmeter 9 to provide proportional output signals to a mechanism for swivelling the vectoring nozzles. The potentiometer 9 is mounted on the lever 2 adjacent to the hinged connection 8.

Pivoted for rotation about an axis transverse to the fore and aft direction, i.e. an axis perpendicular to the plane of the paper of FIG. 2. at the top end of the lever 2 is an elongated handle 10.

In operation attempted fore and aft movement of the lever 2 causes the base support 5 to rock about one of the two fulcrums 11a, or 11b, depending on the direction of attempted movement. Normally, when the pilot applies a progressive force to the lever 2 via the handle 10 no actual movement occurs. However the pilot input force will greatly reduce the force on two of the force transducers 7a and reduce the force on the other sensor pair 7b to a lesser extent.

The outputs from the force transducers 7a, 7b, are used to control engine throttle demand in a known manner.

Pre-loading the force transducers in compression prevents over-load and possible destruction of the transducers in use. The force transducers can conveniently comprise strain gauges.

The handle 10 of the lever 2 is a special design to provide the pilot with tactile information regarding the engine control demand he has selected. The handle 10 is of generally ellipsoidal shape in cross-section as shown in FIGS. 1 and 2. It consists of two cylindrical sleeves 12 and 13 mounted on bearings in a carriage member 14. Its operation will now be described with reference to FIG. 4. Reference may also be made to FIGS. 1, 3a, 3b, and 4 of the aforementioned EP-A-0 326 439 for a general description of the control handle 10 but with the following important modifications.

The handle 10 has only one freely rotatable roller at 12, not two. A toothed belt 15 (see FIG. 2) connects the single roller 12 with a larger diameter cylindrical sleeve 13 which is pivotally connected to the lever 2. As before, the sleeve 13 houses within it a drive motor 16 and an epicyclic gearbox 17 having a drive axis 18.

Rotation of the motor 16 will thus raise the roller 12 with respect to the larger sleeve 13 or lower it, depending on the direction of rotation (see FIG. 1). The motor 16 is driven in an appropriate direction in response to fore and aft pressure on the lever 2 and corresponding output signals from the force transducers 7a and 7b, thus giving the pilot a sense of feel to the throttle demand.

It is envisaged that the transition from wing-borne to jet-borne flights could be made with the aid of a pilot-operated switch which could be incorporated with the control member.

I claim:

1. Control apparatus for a STOVL aircraft having an engine and vectorable nozzle means, the apparatus comprising:
   a force throttle responsive to forces exerted thereon by an operator,
   a handle pivoted on a lever of said force throttle for rotation about an axis transverse to a direction of application of said forces,
   means for rotating said handle in a first plane to predetermined angular positions dependent on said forces and effective in use to provide first control signals to remotely located means for controlling engine thrust the magnitude of which is indicated by said predetermined angular positions, and
   means for pivoting said lever in a second plane generally orthogonal to said first plane and effective in use to provide second control signals to remotely located means for controlling the orientation of said vectoring means between a horizontal position for normal flight and a vertical position for take-off, landing or hovering flights.

2. Control apparatus according to claim 1, wherein said lever includes a rotary potentiometer mounted thereon for detecting pivotal movement thereof.

3. Control apparatus according to claim 1 wherein said handle incorporates a toothed belt entrained around and meshing with a freely rotating roller and a cylindrical sleeve, said cylindrical sleeve including a drive motor and an epicyclic gearbox whereby fore and aft forces applied to the handle cause the motor to rotate, drive the gearbox and rotate the handle.

4. Control apparatus according to claim 1 wherein force transducers are held in compressive contact with said lever and are responsive to forces exerted on said force throttle.

* * * * *